M. LEVY.
MICROSCOPIC MEASURING MACHINE.
APPLICATION FILED AUG. 23, 1920.
1,414,142.
Patented Apr. 25, 1922.
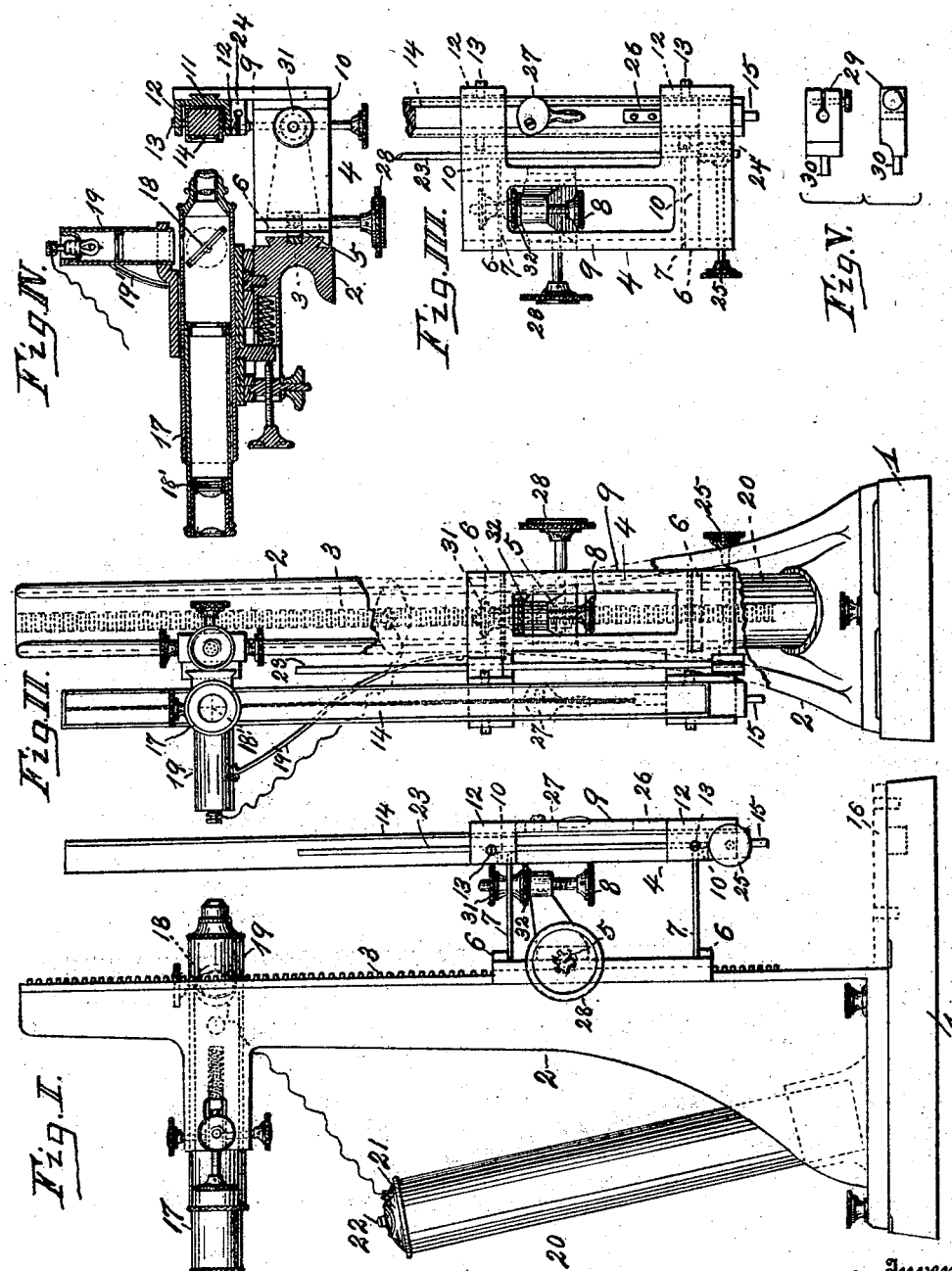

UNITED STATES PATENT OFFICE.

MAX LEVY, OF PHILADELPHIA, PENNSYLVANIA, ASSIGNOR TO HOWARD S. LEVY AND LIONEL F. LEVY, BOTH OF PHILADELPHIA, PENNSYLVANIA.

MICROSCOPIC MEASURING MACHINE.

1,414,142.             Specification of Letters Patent.     Patented Apr. 25, 1922.

Application filed August 23, 1920. Serial No. 405,257.

*To all whom it may concern:*

Be it known that I, MAX LEVY, a citizen of the United States of America, residing at Philadelphia, in the county of Philadelphia and State of Pennsylvania, have invented certain new and useful Improvements in Microscopic Measuring Machines, of which the following is a specification.

The object of this invention is to provide an improved measuring instrument which is simple and effective for quickly and accurately ascertaining the thickness of an object when placed upon a plane surface or table to be engaged by a contact point with which is associated a scale-bar, the bar being maintained by a frame which is connected by springs or flexible supports to a carriage that is adjustable upon a stand which carries a microscope for reading the lines or rulings of the scale-bar, to determine the gage of an object on the table and engaged by the contact point.

The invention may be said to comprise a stand that is provided with a plane surface, a microscope having its axis parallel to the surface upon which the object to be measured is placed, an adjustable carriage associated with the stand the same maintaining resilient means for supporting a contact point and a scale-bar, as will be hereinafter set forth, to provide a sliding contact micrometer.

The accompanying drawings illustrate a microscopic measuring instrument or sliding contact micrometer which embodies a preferred form of my invention, and in which—

Figure I, is a side elevation; Fig. II, is a rear view, Fig. III, is a front elevation of the carriage and scale-bar, detached from the stand. Fig. IV, is a transverse section, and Fig. V, shows detail views of an inside gage attachment.

Referring to the drawings, 1 indicates a base to which is attached either directly or indirectly an upright column or stand 2 having a vertical face that is provided with a rack 3, and a slideway that may consist of dovetailed tenons to maintain in movable engagement with the stand, a carriage 4, having a mortise with bevelled edges and a recess to receive a part of a pinion 5 which engages the rack 3, the pinion being attached to a shaft which is carried by bearings which are maintained by the carriage 4, and at a suitable distance beyond the carriage the shaft is provided with a milled head 28 for manually turning the shaft and its pinion to raise and lower the carriage.

The carriage 4 has attached thereto cross pieces 6—6 to which are secured flat springs or plates 7—7 and it is also provided with an arm or bracket that carries a set-screw 8 for engagement with the underside of one of the springs to provide a rest or non-resilient support for the parts carried by the outer ends of the spring plates, when the measuring instrument is not in use, or to adjust the parts carried by the springs to a substantially horizontal position. To the outer ends of the springs there is secured a frame 9, that comprises bars 10 to which are attached the outer ends of the springs 7 and a plate 11 having lugs 12, a pair of the lugs carrying clamping screws 13 which impinge upon a scale-bar 14 to associate the same with the carriage and to provide means for adjusting the same.

The scale-bar is provided with extremely fine horizontal graduations or rulings which extend longitudinally either the entire length of the bar or only upon a portion thereof to suit the requirements of the measurements to be made and read by use of the microscope. The carriage is provided below the lower end of the scale-bar with a block that carries a contact point 15 for engagement with the face of an object to be measured, such object being placed upon the table or anvil 16 of the base.

The table, anvil or support 16 for the object may be removably attached to the base and it may be apertured at different points to receive pins or stops when the device is used to measure plane surfaces or projections on surfaces, or recesses therein. The apertures in the plate or table 16 may also serve to carry sockets or supports for bars or tubes or the like in measuring the length thereof.

The construction of the carriage is such that the same may be raised or lowered, the scale-bar is adjustably attached thereto, and the springs maintain the scale-bar in parallelism with the face of the stand and will press the contact point upon the object to be measured. It will be noted that the construction of the carriage is such that the scale-bar is positioned to one side of the slideway.

The stand 2 has associated therewith a microscope 17 that is maintained to be in line with the graduations of the scale-bar, the microscope is provided with the usual adjusting screws or clamps, as well as cross hairs or lines 18' when desired, and for the purpose of illumination the microscope has within its tube a transparent reflector or mirror 18, and in line therewith an offset chamber or tube 19 for an incandescent electric lamp, the light therefrom being thrown upon the reflector and deflected forward upon the graduations of the scale-bar so that the same may be read, and at the same time rendering distinct the cross hairs or lines 18' located within the microscope.

The base has attached thereto a hollow handle 20 the same being adapted to have placed therein a dry cell or storage battery 21 which is connected with an electric lamp by suitable connections including a circuit maker and breaker of the usual type, as a push button 22 on the top of the battery 21.

The instrument herein described and illustrated may be modified as to details of construction, and in the form shown may be used to ascertain with microscopic precision the thickness of an object when placed upon the table and engaged by the contact point, the amount of pressure of the contact point upon an object being determined either by the adjustment of the carriage or by the set screw 8.

By providing a resilient support for the contact point the same may be readily raised to permit an object beneath the same, to determine for instance the gage of metals, paper, glass, or the thickness of parts thereof.

The instrument is of such construction that provision is made for setting the carriage by a test block placed upon the table as well as the scale-bar to accord with the temperature and other factors to insure accurate measurements or comparisons, and the spring supported frame that forms a part of the carriage to which the scale-bar is attached may be used to maintain other graduated measuring devices, as a rule, protractor, depth-gage, or other appliance having graduations which are usually read by a microscope having a position indicator.

The drawings illustrate a microscope which is held by the stand and is adjustable to position its tube at right angles to the graduated face of the scale-bar which microscope has the usual adjustments or set screws and clamps.

The sliding rod or depth-gage 23, is adjustably secured to the frame 9 which is a part of the carriage 4, and has guide lugs, one of the lugs 24 being of the clamp-type or slitted so that its aperture can be reduced to clamp the gage bar 23 when the shouldered screw is turned by means of the milled head 25 of the screw.

The frame of the scale bar 14 that is resiliently supported by the springs attached to the carriage is provided with a fixed stop 26, which is positioned to engage with the upper edge of a portion of the carriage, the support for the scale bar has also attached thereto a cam 27 that has a handle, the cam being shaped so that when turned upon its pivot it will engage an underside of an upper member of the carriage, the stop and the cam providing means for locking the scale bar carrying frame so that the scale bar will be movable with the carriage. When the cam is in the position shown by Fig. III, the scale bar will have a limited vertical movement independent of the spring supports which may be held in a fixed position by turning the thumb nuts 31 and 32 that engage with the screw having a milled head 8.

The contact point 15 that is associated with the lower end of the scale bar, or with its supporting frame, or the bar 23, are either adapted to have attached thereto adjacent to their lower ends, an inside gage 29, the contact point 30 thereof projecting at right angles to engage with the inside of an object.

The construction and the means for adjusting the microscope may be varied it being desirable to provide the same with means to vary the position of its axis both vertically and horizontally to bring its axis in line with the microscopic lines of the scale bar.

I claim.

1. In a precision measuring instrument, a stand or support provided with a movable carriage, a scale-bar and a contact member maintained in resilient engagement with the carriage.

2. In a precision measuring instrument, a base, a stand or support attached to the base, a microscope maintained by the stand, a carriage adjustably associated with the stand and provided with a resiliently supported contact member and a scale-bar.

3. In a precision measuring instrument for use with a scale having microscopic graduations thereon, a stand, a microscope maintained by the stand, a carriage in movable engagement with the stand, resilient members attached to the carriage, adjustable means for maintaining a scale-bar attached to the resilient members to position the graduations of the scale-bar in line with the longitudinal axis of the microscope and a contact member below the scale-bar.

4. In a precision measuring instrument, a base provided with an object supporting table and a stand which maintains a microscope said stand having out of line with the microscope ways for a slidable carriage, a slidable carriage associated with the stand, flexible supports that maintain a frame, a graduated bar carried by the frame and maintained in line with the microscope, and a contact member also carried by the frame.

5. In a device for the purpose set forth, a portable precision measuring instrument, comprising a base or stand provided with a table, a detachable upright, a microscope maintained by the stand, a reflector, a battery, and an electric lamp as accessories of the microscope, a handle associated with the base and adapted to serve as a receptacle for the battery, means for connecting the battery with the lamp, a carriage movably attached to the upright, and a scale-bar maintained in flexible engagement with the carriage so that the graduations of the scale-bar will be in line with the microscope.

6. In a precision measuring instrument, a base provided with a table, a support, a microscope associated with and maintained by the support, a movable carriage which is slidable upon said support, a graduated scale and a contact point associated with the carriage, means for flexibly associating the graduated scale and the contact point with the carriage, and means for limiting downward flexure of the carrier for the graduated scale and the contact point.

7. In a precision measuring instrument, a base provided with a table and a stand provided with a microscope, a way for a movable carriage located to one side of the longitudinal axis of the microscope, a carriage for said stand, springs attached to the carriage, a graduated scale, a support for the graduated scale attached to the springs and extending to one side thereof to locate the scale in line with the microscope, a contact member carried by the support, and means on the carriage for limiting the flexure of the support.

MAX LEVY.